United States Patent [19]

Hashimoto et al.

[11] 4,431,595
[45] Feb. 14, 1984

[54] FLUORINE-CONTAINING AMINOSULFONATE

[75] Inventors: Yutaka Hashimoto; Masayuki Kamei, both of Urawa; Toshihiko Umaba, Takaishi; Tadashi Ito, Osaka, all of Japan

[73] Assignees: Dainippon Ink & Chemicals, Inc., Tokyo; Kawamura Institute of Chemical Research, Saitama, both of Japan

[21] Appl. No.: 301,413

[22] Filed: Sep. 11, 1981

[30] Foreign Application Priority Data

Mar. 14, 1980 [JP] Japan .................................. 55-31639

[51] Int. Cl.$^3$ ............................................ C07C 143/02
[52] U.S. Cl. ............................. 260/513 F; 260/513 N; 260/501.12; 260/509; 260/510; 252/554; 252/355; 252/321; 252/2; 252/3; 252/391
[58] Field of Search ...................... 260/501.2, 509, 510, 260/513 N, 513 F

[56] References Cited

U.S. PATENT DOCUMENTS

| | | | |
|---|---|---|---|
| 2,243,437 | 5/1941 | Orthner et al. | 260/510 X |
| 3,911,056 | 10/1975 | Houghton | 260/509 X |
| 4,001,285 | 1/1977 | Hochreuter | 260/513 N X |
| 4,014,926 | 3/1977 | Dear et al. | 260/513 N |
| 4,138,345 | 2/1979 | Williams | 260/513 N X |

Primary Examiner—Bernard Helfin
Attorney, Agent, or Firm—Sherman & Shalloway

[57] ABSTRACT

A fluorine-containing aminosulfonate of the general formula $$R_f\text{-}Q_1\text{-}N(R_1)\text{-}Q_2\text{-}N(R_2)\text{-}Q_3\text{-}SO_3M$$

wherein $R_f$ represents a perfluorinated aliphatic group having 3 to 16 carbon atoms; $Q_1$ represents $-(CH_2)_h-$ in which h represents an integer of 1 to 6, $-(CH_2CH_2Z)_i-$ in which Z represents $-O-$ or $-S-$, and i represents an integer of 1 to 4,

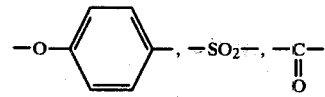

or a combination of these; $Q_2$ and $Q_3$ are identical or different and each represents $-(CH_2)_j-$ in which j represents an integer of 1 to 6,

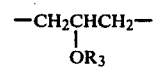

in which $R_3$ represents a hydrogen atom or an alkyl group having 1 to 4 carbon atoms, or

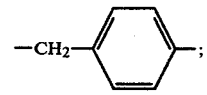

M represents a hydrogen atom, an alkali metal atom, an alkaline earth methal atom, or $-N(H)_m(R_4)_n$ in which $R_4$ represents an alkyl group having 1 to 3 carbon atoms, and m and n represent 0 or an integer of 1 to 4 provided that $m+n=4$; $R_1$ represents a hydrogen atom or an alkyl group having 1 to 12 carbon atoms; and $R_2$ represents a hydrogen atom, an alkyl or hydroxyalkyl group having 1 to 4 carbon atoms, $-Q_3SO_3M$ in which $Q_3$ and M are as defined, or $-(CH_2)_k\text{COOM}$ in which M is as defined and k represents an integer of 1 to 4.

3 Claims, No Drawings

FLUORINE-CONTAINING AMINOSULFONATE

This invention relates to a novel fluorine-containing aminosulfonic acid-type amphoteric compound characterized by containing a perfluorinated aliphatic group and an aminosulfonate group in the molecule.

Amphoteric surface-active agents have recently attracted attention as general-purpose surfactants because they have superior compatibility with other kinds of surfactants having different ionic properties.

Amphoteric surface-active agents containing a perfluoroalkyl group as a fluorinated aliphatic group have better surface-activating properties such as the ability to reduce surface tension and foamability than amphoteric surface-active agents containing an alkyl group. Attempts have therefore been made to apply these amphoteric surfactants to various uses in spite of their higher costs than the alkyl-containing amphoteric surfactants.

Known fluorine-containing amphoteric surfactants contain nitrogen atoms quaternized with a methyl, ethyl or hydroxyethyl group, and are classified as betaine-type amphoteric surfactants.

Frequently, these known betaine-type amphoteric surfactants cannot fully exhibit sufficient performance at a pH near their isoelectric point in regard to surface activating properties such as the ability to reduce surface tension, foamability, solubility in water and resistance to hard water.

It is an object of this invention to provide an amphoteric surface-active agent free from these defects.

As an amphoteric surface-active agent meeting the above object, the present invention provides a fluorine-containing aminosulfonate of the general formula $$R_f\text{—}Q_1\text{—}N(R_1)\text{—}Q_2\text{—}N(R_2)\text{—}Q_3\text{—}SO_3M \qquad [I]$$

wherein $R_f$ represents a perfluorinated aliphatic group having 3 to 16 carbon atoms; $Q_1$ represents $+CH_2)_h$ in which h represents an integer of 1 to 6, $+CH_2CH_2Z)_i$ in which Z represents —O— or —S—, and i represents an integer of 1 to 4,

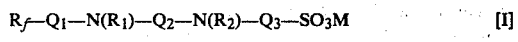

or a combination of these (examples of preferred combinations are $+CH_2)_nSO_2$—, $+CH_2CH_2Z)_iSO_2$—,

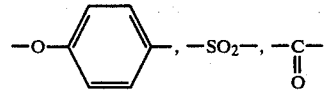

$+CH_2)_hCO$—, $+CH_2CH_2Z)_iCO$—, and

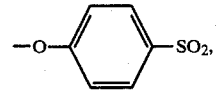

$Q_2$ and $Q_3$ are identical or different and each represents $+CH_2)_j$ in which j represents an integer of 1 to 6,

—CH₂CHCH₂—
   |
   OR₃ in which $R_3$ represents a hydrogen atom or an alkyl group having 1 to 4 carbon atoms, or

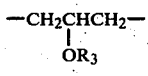

M represents a hydrogen atom, an alkali metal atom, an alkaline earth metal atom, or $\text{—N(H)}_m(R_4)_n$ in which $R_4$ represents an alkyl group having 1 to 3 carbon atoms, and m and n represent 0 or an integer of 1 to 4 provided that $m+n=4$; $R_1$ represents a hydrogen atom or an alkyl group having 1 to 12 carbon atoms; and $R_2$ represents a hydrogen atom, an alkyl or hydroxyalkyl group having 1 to 4 carbon atoms, $-Q_3SO_3M$ in which $Q_3$ and M are as defined, or $+CH_2)_k COOM$ in which M is as defined and k represents an integer of 1 to 4.

In formula [I], typical examples of $R_f$ are linear, branched and/or cyclic (e.g. cyclohexyl) perfluoroalkyl and perfluoroalkenyl groups. $R_f$ may also represent a group having an oxygen atom in the main chain, such as $(CF_3)_2CFOCF_2CF_2$—.

Specific examples of the fluorine-containing aminosulfonate of general formula [I] are listed below.

$C_8F_{17}SO_2NH(CH_2)_3N(CH_3)(CH_2)_3SO_3Na$,
$C_8F_{17}SO_2NH(CH_2)_3N(CH_2CH_2OH)(CH_2)_3SO_3Na$,
$C_6F_{13}SO_2N(CH_3)(CH_2)_3N(C_2H_5)CH_2CH(OH)CH_2SO_3K$,
$C_7F_{15}CONH(CH_2)_2N(CH_3)(CH_2)_3SO_3Na$,

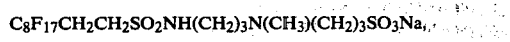

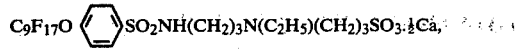

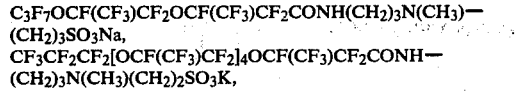

$C_3F_7OCF(CF_3)CF_2OCF(CF_3)CF_2CONH(CH_2)_3N(CH_3)—$
$(CH_2)_3SO_3Na$,
$CF_3CF_2CF_2[OCF(CF_3)CF_2]_4OCF(CF_3)CF_2CONH—$
$(CH_2)_3N(CH_3)(CH_2)_2SO_3K$,

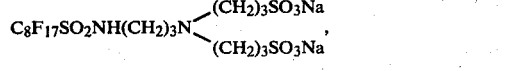

H   CH₃
$C_6F_{13}CH_2CH_2N(CH_2)_3N(CH_2)_3SO_3Na$, and

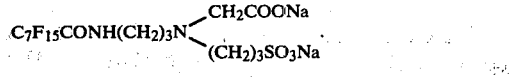

The fluorine-containing aminosulfonate of general formula [I] can be produced in a high yield by, for example, reacting a perfluoroalkylcarboxylic acid, a perfluoroalkylsulfonic acid or an acid halide or ester thereof, $R_f$—$(CH_2)_h$—$SO_2X$,

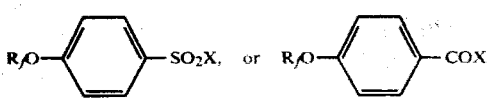

which X is a halogen atom, which is reactive and dily available, with a diamine of the formula $HNQ_2NR_2H$, and condensing the resulting fluorine-itaining amino compound $R_fQ_1-NR_1-Q_2NR_2H$ h a compound of the formula $YQ_3SO_3M$ in which Y )H or a halogen other than fluorine, preferably in the sence of an alkali.

The intermediate fluorine-containing amino com- und $R_fQ_1-NR_1-Q_2NR_2H$ can also be produced by ng another known method. For example, a fluorine-itaining hydroxyamino compound of the formula $Q_1-NR_1-CH_2CH(OH)CH_2-NR_2H$ is produced converting an acid amide of the formula $R_fQ_1NR_1H$ o its Na salt by using $NaOCH_3$ or NaH, and reacting with epichlorohydrin to form a fluorine-containing oxide of the formula

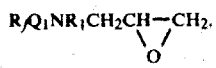

1 then reacting it with an amine of the formula $NHR_2$.

Table 1 summarizes the foamabilities and surface sions of aqueous solutions of some of the fluorine-ntaining aminosulfonates of the invention.

In contrast, it has been found that the compounds in accordance with this invention dissolve completely in water even under strong acidity represented by a pH of 2 for example, and their surface-activating properties are not deteriorated in any pH region, i.e. in any of acidity, neutrality and basicity.

The stability of the compounds of this invention against changes in pH is very useful in practical applications.

It has further been found that the compounds of this invention have very good calcium ion stability. Examination of $Ca^{2+}$ stability by the improved Hardt method (B. G. Wilkes et al., Ind. Eng. Chem., Vol. 29, p. 1234, 1937) shows that the compounds of this invention form a complete solution in water having a hardness of at least 5,000 ppm (calculated as $CaCO_3$) even at a pH of 8.0. In contrast, a known betaine compound, such as $C_6F_{13}SO_2NH(CH_2)_3{}^+N(CH_3)_2CH_2COO^-$, begins to undergo phase separation when the water has a hardness of 1,300 ppm.

It is difficult to elucidate theoretically such excellent surface-activating properties of the compounds of this invention. It is presumed however that these properties are ascribable to the hydrophobic effect based on the perfluoroalkyl group and the hydrophilic effect based on the aminosulfonate group.

By utilizing the excellent surface-activating properties of the fluorine-containing aminosulfonate compounds of the invention, such as foamability, the ability to reduce surface tension, resistance to hard water, and dissolving stability against pH changes, they are useful in application to foam fire extinguishing agents, water

TABLE 1

| orine-containing aminosulfonate | 0.1% aqueous solution | | |
|---|---|---|---|
| | Foamability (*1) | | Surface (*2) tension (dyne/cm) |
| | (Solution in distilled water) | (Solution in sea water) | |
| $F_{13}SO_2NH(CH_2)_3N(CH_3)(CH_2)_3SO_3Na$ | 192 | 220 | 16.4 |
| $F_{13}SO_2NH(CH_2)_3NH(CH_2)_3SO_3Na$ | 217 | 216 | 15.9 |
| $F_{13}SO_2NH(CH_2)_3N(CH_3)(CH_2)_2SO_3Na$ | 188 | 192 | 15.8 |
| $F_{13}SO_2NH(CH_2)_3NH(CH_2)_2SO_3Na$ | 210 | 195 | 15.8 |
| $F_{13}SO_2NH(CH_2)_3N(CH_3)CH_2CHCH_2SO_3Na$<br>　　　　　　　　　　　　　$\mid$<br>　　　　　　　　　　　　　OH | 230 | 230 | 16.5 |
| $F_{13}SO_2NH(CH_2)_3NHCH_2CHCH_2SO_3Na$<br>　　　　　　　　　　　$\mid$<br>　　　　　　　　　　　OH | 206 | 222 | 15.4 |
| $F_{13}SO_2N(C_3H_7)(CH_2)_3N(CH_3)CH_2CHCH_2SO_3Na$<br>　　　　　　　　　　　　　　　　$\mid$<br>　　　　　　　　　　　　　　　　OH | 218 | 220 | 16.9 |
| $F_{13}SO_2N(C_3H_7)(CH_2)_3NHCH_2CHCH_2SO_3Na$<br>　　　　　　　　　　　　　　$\mid$<br>　　　　　　　　　　　　　　OH | 200 | 215 | 18.0 |
| $F_{15}CONH(CH_2)_3N(CH_3)(CH_2)_3SO_3Na$ | 220 | 220 | 16.0 |
| mparison　$C_6F_{13}SO_2NH(CH_2)_3{}^\oplus N(CH_3)_2CH_2COO^\ominus$ | 110 | 70 | 21.6 |

Ross-Miles method (25° C.) Height of foams immediately after agitation by liquid dropping.
Wilhelmy method (25° C.) (Solution in distilled water)

A known betaine-type amphoteric surface-active ent, such as $C_8F_{17}SO_2NH(CH_2)_3{}^\oplus N(CH_3)_2CH-OO^\ominus$ in aqueous solution, undergoes phase separation at a pH of less than 8.0, and its surface-activating operties are markedly deteriorated. Hence, the pH ist always be maintained at neutrality or a higher lue in use, and this constitutes a drawback against its tual use.

film-forming fire extinguishing agents for oil fire, foaming agents, detergents, wetting agents, etc. They are also suitably applicable to levelling agents, paint additives, antifouling agents, oil repelling agents, plastics additives, antistatic agents, mold releasing agents, etc.

The following Examples illustrate the present invention more specifically.

EXAMPLE 1

Synthesis of $C_6F_{13}SO_2N(H)CH_2CH_2CH_2N(CH_3)CH_2CH_2SO_3Na$:—

Synthesis of $C_6F_{13}SO_2N(H)CH_2CH_2CH_2N(CH_3)H$:— (1)

264 g (3.0 moles) of N-methyl-1,3-diaminopropane and 400 g of sufficiently dehydrated isopropyl ether were weighed into a 2-liter three-necked round-bottomed flask equipped with a cooling condenser and a stirrer in an atmosphere of nitrogen. With sufficient stirring, 422 g (1.05 moles) of perfluorohexylsulfonyl fluoride was added dropwise at room temperature. The mixture was stirred at 50° C. for 3 hours, and then the isopropyl ether was removed under reduced pressure. The yellow solid residue was dissolved in 500 ml of ethanol, and with stirring, gradually poured into 8 liters of distilled water. The resulting crystals were aged. The supernatant liquid was removed by decantation, and decantation was performed three more times using 5 liters of distilled water each time. The crystals were collected by filtration, washed with distilled water, and dried at 70° C. under reduced pressure. The product had a sufficient purity for use in the subsequent reaction. The amount of the product yielded was 446 g.

| Elemental analysis: | | | |
|---|---|---|---|
| | C | H | N |
| Found (%): | 25.5 | 2.4 | 5.9 |
| Calculated (%): | 25.5 | 2.3 | 6.0 |

IR spectrum: 1370 cm$^{-1}$ (—SO$_2$N< $\nu$as),

NMR spectrum (CD$_3$OD solvent: TMS standard): 1.80 ppm (m, 2H), 2.65 ppm (s, 3H), 3.05 ppm (t, 2H), 3.26 ppm (t, 2H).

Synthesis of $C_6F_{13}SO_2N(H)CH_2CH_2CH_2N(CH_3)CH_2CH_2SO_3Na$:— (2)

46 g (0.098 mole) of N-(3-methylaminopropyl)perfluorohexyl sulfonamide and 250 g of isopropyl alcohol were weighed into a 1-liter four-necked round-bottomed flask equipped with a cooling condenser and a stirrer, and heated to form a solution. With vigorous stirring at 80° C., 100 ml of an aqueous solution of 25.3 g (0.12 mole) of sodium 2-bromoethanesulfonate and 100 ml of an aqueous solution of 4.8 g (0.12 mole) of sodium hydroxide were simultaneously added dropwise to the solution. After the addition, the mixture was reacted under reflux at 80° to 90° C. for 10 hours. The isopropyl alcohol and water were distilled off under reduced pressure. The solid residue was dried at 50° C. under reduced pressure, and recrystallized from ethanol to give 60 g of the captioned compound.

| Elemental analysis: | | | |
|---|---|---|---|
| | C | H | N |
| Found (%): | 24.3 | 2.4 | 4.6 |
| Calculated (%): | 24.0 | 2.3 | 4.7 |

IR spectrum: 1370 cm$^{-1}$ (—SO$_2$N< $\nu$as), 1080 cm$^{-1}$ (—SO$_3$Na $\nu$s).

NMR spectrum (D$_2$O solvent: DSS standard): 1.80 ppm (m, 2H), 2.60 ppm (S, 3H), 3.10 ppm (m, 4H), 3.18 ppm (m, 4H).

EXAMPLE 2

Synthesis of $C_6F_{13}SO_2N(H)CH_2CH_2CH_2N(CH_3)CH_2CH_2CH_2SO_3Na$:—

30 g (0.064 mole) of N-(3-methylaminopropyl)perfluorohexyl sulfonamide and 180 g of isopropyl alcohol were weighed into a 500 ml four-necked round-bottomed flask equipped with a cooling condenser and a stirrer, and heated to form a solution. With stirring at 80° C., 50 ml of an aqueous solution of 13.9 g (0.077 mole) of sodium 3-chloropropanesulfonate and 50 ml of an aqueous solution of 3.1 g (0.077 mole) of sodium hydroxide were simultaneously added dropwise to the solution. After the addition, the mixture was reacted under reflux at 80° to 90° C. for 10 hours. The isopropyl alcohol and water were distilled off under reduced pressure. The oily residue was dried with hot air at 50° C., and recrystallized from ethanol to give 28 g of the captioned compouned.

| Elemental analysis: | | | |
|---|---|---|---|
| | C | H | N |
| Found (%): | 25.3 | 2.8 | 4.6 |
| Calculated (%): | 25.4 | 2.6 | 4.6 |

IR spectrum: 1370 cm$^{-1}$ (—SO$_2$N< $\nu$as), 1085 cm$^{-1}$ (—SO$_3$Na $\nu$s).

NMR spectrum (D$_2$O solvent: DSS standard): 1.80 ppm (m, 2H), 2.10 ppm (m, 2H), 2.60 ppm (s, 3H), 2.98 ppm (m, 4H), 3.08 ppm (m, 4H).

EXAMPLE 3

Synthesis of $C_8F_{17}SO_2N(H)CH_2CH_2CH_2N(CH_3)CH_2CH(OH)CH_2SO_3Na$:—

18 g (0.032 mole) of N-(3-methylaminopropyl)perfluorohexyl sulfonamide and 100 g of isopropyl alcohol were weighed into a 500 ml four-necked flask equipped with a cooling condenser and a stirrer, and heated to form a solution. With stirring at 80° C., 50 ml of an aqueous solution of 7.4 g (0.038 mole) of sodium 2-hydroxy-3-chloropropanesulfonate and 50 ml of an aqueous solution of 1.5 g (0.038 mole) of sodium hydroxide were simultaneously added dropwise to the solution. After the addition, the mixture was reacted under reflux at 80° to 90° C. for 10 hours. The isopropyl alcohol and water were distilled off under reduced pressure. The yellow solid residue was dried at 60° C. under reduced pressure, and recrystallized from a mixture of ethanol and ethyl acetate to give 15 g of the captioned compound.

| Elemental analysis: | | | |
|---|---|---|---|
| | C | H | N |
| Found (%) | 25.0 | 2.2 | 4.0 |

| -continued | | | |
|---|---|---|---|
| | Elemental analysis: | | |
| | C | H | N |
| Calculated (%) | 25.2 | 2.2 | 3.9 |

IR spectrum: 1372 cm$^{-1}$ (—SO$_2$N< νas), 1080 cm$^{-1}$ -SO$_3$Na νs).

NMR spectrum (D$_2$O solvent: DSS standard): 1.82 ppm (m, 2H), 2.60 ppm (s, 3H), 2.95 ppm (m, 4H), 3.04 ppm (m, 4H), 4.34 ppm (m, 1H).

EXAMPLE 4

Synthesis of
C$_6$F$_{13}$SO$_{2H}$NCH$_2$CH$_2$CH$_{2H}$NCH$_2$CH$_2$SO$_3$Na (1) Synthesis of C$_6$F$_{13}$SO$_{2H}$NCH$_2$CH$_2$CH$_2$NH$_2$ 111 g (1.5 moles) of 1,3-diaminopropane and 300 g of fully dehydrated isopropyl ether were weighed in an atmosphere of nitrogen into a 2-liter three-necked round-bottomed flask equipped with a cooling condenser and stirrer. With sufficient stirring, 237 g (0.59 mole) of perfluorohexyl sulfonyl fluoride was added dropwise at room temperature from a dropping funnel. The mixture was stirred at 50° C. for 3 hours, and then the isopropyl ether was removed under reduced pressure. The oily residue was dissolved in 200 ml of ethanol, and gradually poured into 5 liters of distilled water with stirring. The resulting crystals were aged. The supernatant liquid was removed by decantation, and 1 liter of 0.5 N aqueous sodium hydroxide solution was added to wash the crystals. Decantation was performed for three more times using 5 liters of distilled water each time. The crystals were collected by filtration, washed with distilled water and dried at 60° C. under reduced pressure. There was obtained 268 g of N-(3-aminopropyl)perfluorohexyl sulfonamide having a sufficient purity for use in the subsequent reaction.

| | Elemental analysis: | | |
|---|---|---|---|
| | C | H | N |
| Found (%) | 23.8 | 1.9 | 6.0 |
| Calculated (%) | 23.7 | 2.0 | 6.1 |

IR spectrum: 1370 cm$^{-1}$ (—SO$_2$N< νas).

NMR spectrum (CD$_3$OD solvent; TMS standard): 1.76 ppm (m, 2H), 2.85 ppm (t, 2H), 3.20 ppm (t, 2H).

(2) Synthesis of
C$_6$F$_{13}$SO$_{2H}$NCH$_2$CH$_2$CH$_{2H}$NCH$_2$CH$_2$SO$_3$Na 15 g (0.033 mole) of N-(3-aminopropyl)perfluorohexyl sulfonamide and 100 g of isopropyl alcohol were weighed into a 500 ml four-necked round-bottomed flask equipped with a cooling condenser and a stirrer, and heated to form a solution. With vigorous stirring at 80° C., 30 ml of an aqueous solution of 8.4 g (0.04 mole) of sodium 2-bromoethanesulfonate was added dropwise to the solution while maintaining the pH of the solution at 8–9 with a 2 N aqueous solution of sodium hydroxide using a pH stat. (As shown in Examples 1, 2 and 3, an aqueous solution containing an equimolar amount of sodium hydroxide may be added dropwise at the same time as the aqueous solution of sodium bromoethanesulfonate.) After the addition, the mixture was refluxed at 80° to 90° C. for 10 hours. The isopropyl alcohol and water were distilled off under reduced pressure. The solid residue was dried at 50° C. under reduced pressure, and recrystallized from a mixture of ethanol and ethyl acetate to give 13 g of the captioned compound.

| | Elemental analysis: | | |
|---|---|---|---|
| | C | H | N |
| Found (%) | 22.8 | 2.1 | 4.6 |
| Calculated (%) | 22.5 | 2.0 | 4.8 |

IR spectrum: 1370 cm$^{-1}$ (—SO$_2$N< νas), 1070 cm$^{-1}$ (—SO$_3$Na νs).

NMR spectrum (D$_2$O solvent: DSS standard): 1.77 ppm (m, 2H), 3.06 ppm (m, 4H) 3.12 ppm (m, 4H).

EXAMPLE 5

Synthesis of
C$_6$F$_{13}$SO$_{2H}$NCH$_2$CH$_2$CH$_{2H}$NCH$_2$CH$_2$CH$_2$SO$_3$Na 15 g (0.033 mole) of N-(3-aminopropyl)perfluorohexyl sulfonamide and 100 g of isopropyl alcohol were weighed into a 500 ml four-necked round-bottomed flask equipped with a cooling condenser and a stirrer, and heated to form a solution. With stirring at 80° C., 30 ml of an aqueous solution of 7.2 g (0.04 mole) of sodium 3-chloropropanesulfonate and 30 ml of an aqueous solution of 1.5 g of sodium hydroxide were simultaneously added dropwise to the solution. After the addition, the mixture was reacted under reflux at 80° to 90° C. for 9 hours. The isopropyl alcohol and water were distilled off under reduced pressure. The yellow solid residue was dried at 60° C. under reduced pressure, and recrystallized from a mixture of ethanol and ethyl acetate to give 13.8 g of the captioned compound.

| | Elemental analysis: | | |
|---|---|---|---|
| | C | H | N |
| Found (%) | 23.8 | 2.2 | 4.9 |
| Calculated (%) | 24.0 | 2.3 | 4.7 |

IR spectrum: 1370 cm$^{-1}$ (—SO$_2$N< νas), 1070 cm$^{-1}$ (—SO$_3$Na νs).

NMR spectrum (D$_2$O solvent: DSS standard): 1.90 ppm (m, 2H), 2.05 ppm (m, 2H), 2.99 ppm (m, 4H), 3.11 ppm (m, 4H).

EXAMPLE 6

Synthesis of C$_6$F$_{13}$SO$_2$NCH$_2$CH$_2$CH$_2$NCH$_2$CHCH$_2$SO$_3$Na
$\quad\quad\quad\quad\quad\quad\quad$ H $\quad\quad\quad\quad$ H $\;\;$ |
$\quad\quad\quad\quad\quad\quad\quad\quad\quad\quad\quad\quad\quad\quad\quad\;\;$ OH 15 g (0.033 mole) of N-(3-aminopropyl)perfluorohexyl sulfonamide was dissolved under heat in 100 g of isopropyl alcohol in a 500 ml four-necked round-bottomed flask equipped with a cooling condenser and a stirrer. With stirring at 80° C., 30 ml of an aqueous solution of 7.8 g (0.04 mole) of sodium-2-hydroxy-3-chloropropanesulfonate and 30 ml of an aqueous solution of 1.6 g (0.04 mole) of sodium hydroxide were simultaneously added dropwise to the solution. The mixture was reacted under reflux at 80° to 90° C. for 10 hours. Then, the isopropyl alcohol and water were distilled off under reduced pressure. The orange-colored solid residue was dried at 60° C. under reduced pressure, and recrystallized from a mixture of ethanol and ethyl acetate to give 14.1 g of the captioned compound.

| Elemental analysis: | | | |
|---|---|---|---|
| | C | H | N |
| Found (%) | 23.4 | 2.2 | 4.7 |
| Calculated (%) | 23.4 | 2.3 | 4.5 |

IR spectrum: 1370 cm$^{-1}$ ($SO_2N<$ $\nu$as), 1070 cm$^{-1}$ (—$SO_3Na$ $\nu$s).

NMR spectrum ($D_2O$ solvent: DSS standard): 1.88 ppm (m, 2H), 2.82 ppm (m, 4H), 3.12 ppm (m, 4H), 4.23 ppm (m, 1H).

EXAMPLE 7

Synthesis of $C_6F_{13}SO_2NCH_2CH_2CH_2NCH_2CH_2SO_3Na$:—
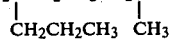

10 g (0.017 mole) of sodium N-methyl-N-(N'-perfluorohexylsulfonyl-γ-aminopropyl)-2-aminoethanesulfonate and 80 g of fully dehydrated dimethyl sulfoxide were weighed in an atmosphere of nitrogen into a 200 ml three-necked round-bottomed flask equipped with a cooling condenser and a stirrer, and heated to form a solution. At 80° C., 4.0 g (0.02 mole) of a 28% methanol solution of sodium methylate was added dropwise, and the mixture was heated to 110° C. to distill off methanol. Then, 3.8 g (0.02 mole) of n-propyl iodide was added dropwise. The reaction was carried out at 110° C. for 6 hours, and the dimethyl sulfoxide was removed under reduced pressure. The yellow solid residue was dried at 70° C. under reduced pressure, and recrystallized from ethanol to give 10.5 g of the captioned compound.

As the following results of NMR spectroscopy show, the tertiary nitrogen atom was not quaternized with n-propyl iodide in the above process.

| Elemental analysis: | | | |
|---|---|---|---|
| | C | H | N |
| Found (%) | 28.3 | 3.2 | 4.2 |
| Calculated (%) | 28.0 | 3.1 | 4.4 |

IR spectrum: 2950–2860 cm$^{-1}$ (—$CH_2$—, —$CH_3$ $\nu$as, $\nu$s), 1370 cm$^{-1}$ (—$SO_2N<$ $\nu$as), 1070 cm$^{-1}$ (—$SO_3Na$ $\nu$s).

NMR spectrum ($D_2O$ solvent: DSS standard): 0.87 ppm (t, 3H), 1.63 ppm (m, 2H), 1.80 ppm (m, 2H), 2.60 ppm (s, 3H), 3.10 ppm (m, 4H), 3.20 ppm (m, 6H).

EXAMPLE 8

Synthesis of

In a 500 ml four-necked round-bottomed flask equipped with a cooling condenser and a stirrer, 14.2 g (0.021 mole) of N-(3-methylaminopropyl)-p-perfluorononenyloxybenzene sulfonamide was dissolved under heat in 100 g of isopropyl alcohol. With stirring at 80° C., 30 ml of an aqueous solution of 5.3 g (0.025 mole) of sodium 2-bromoethanesulfonate and 30 ml of 1.0 g (0.025 mole) of sodium hydroxide were simultaneously added dropwise to the solution. The mixture was reacted under reflux at 80° to 90° C. for 10 hours, and then the isopropyl alcohol and water were distilled off under reduced pressure. The solid residue was dried at 60° C. under reduced pressure, and recrystallized from a mixture of ethanol and ethyl acetate to give 16.0 g of the captioned compound.

| Elemental analysis: | | | |
|---|---|---|---|
| | C | H | N |
| Found (%) | 29.7 | 2.2 | 3.5 |
| Calculated (%) | 29.9 | 2.1 | 3.3 |

IR spectrum: 1370 cm$^{-1}$ (—$SO_2N<$ $\nu$as), 1070 cm$^{-1}$ (—$SO_3Na$ $\nu$s), 830 cm$^{-1}$

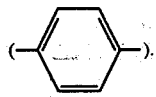

IR spectrum ($D_2O$ solvent: DSS standard): 1.80 ppm (m, 2H), 2.65 ppm (s, 3H), 3.05 ppm (t, 2H), 3.26 ppm (t, 2H).

EXAMPLE 9

Synthesis of

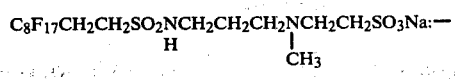

In a 500 ml four-necked flask equipped with a cooling condenser and a stirrer, 12 g (0.02 mole) of N-(3-methylaminopropyl)-2-perfluorooctylethanesulfonamide was dissolved under heat in 100 g of isopropyl alcohol. With stirring at 80° C., 30 ml of an aqueous solution of 5.1 g (0.024 mole) of sodium 2-bromoethane sulfonate and 30 ml of an aqueous solution of 0.96 g (0.024 mole) of sodium hydroxide were simultaneously added dropwise to the solution. The mixture was reacted under reflux at 80° to 90° C. for 9 hours. Then, the isopropyl alcohol and water were distilled off under reduced pressure. The solid residue was dried at 60° C. under reduced pressure, and recrystallized from a mixture of ethanol and ethyl acetate to give 12.7 g of the captioned compound.

| Elemental analysis: | | | |
|---|---|---|---|
| | C | H | N |
| Found (%) | 26.6 | 2.7 | 3.8 |
| Calculated (%) | 26.4 | 2.5 | 3.8 |

IR spectrum: 1370 cm$^{-1}$ (—$SO_2N<$ $\nu$as), 1070 cm$^{-1}$ (—$SO_3Na$ $\nu$s).

NMR spectrum ($D_2O$ solvent: DSS standard): 1.8 ppm (m, 4H), 2.60 ppm (s, 3H), 3.05 ppm (m, 6H), 3.1 ppm (m, 4H).

EXAMPLE 10

Synthesis of $C_7F_{15}CONCH_2CH_2CH_2NCH_2CH_2SO_3Na$:—
  H           CH₃

In a 500 ml four-necked round-bottomed flask equipped with a cooling condenser and a stirrer, 14.5 g (0.03 mole) of N-(3-methylaminopropyl)perfluoroheptamide was dissolved under heat in 100 g of isopropyl alcohol. With stirring at 80° C., 40 ml of an aqueous solution of 7.6 g (0.036 mole) of sodium 2-bromoethanesulfonate and 40 ml of an aqueous solution of 1.4 g (0.036 mole) of sodium hydroxide were simultaneously added dropwise to the solution. The mixture was reacted under reflux at 80° to 90° C. for 9 hours, and then the isopropyl alcohol and water were distilled off under reduced pressure. The solid residue was dried at 60° C. under reduced pressure, and recrystallized from a mixture of ethanol and ethyl acetate to give 16.3 g of the captioned compound.

| | Elemental analysis | | |
|---|---|---|---|
| | C | H | N |
| Found (%) | 27.3 | 2.1 | 4.6 |
| Calculated (%) | 27.4 | 2.3 | 4.6 |

IR spectrum: 1650 cm$^{-1}$ (—CON< amide I absorption band), 1070 cm$^{-1}$ (—SO$_3$Na νs).
NMR spectrum (D$_2$O solvent; DSS standard): 1.82 ppm (m, 2H), 2.60 ppm (s, 3H), 3.10 ppm (m, 4H), 3.19 ppm (m, 4H).

EXAMPLE 11

Synthesis of C$_6$F$_{13}$SO$_2$NCH$_2$CH$_2$CH$_2$NCH$_2$CH$_2$SO$_3$Na:—
　　　　　　　　　|　　　　　　　　|
　　　　　　　　　H　　　　　　　　CH$_2$COONa Synthesis of C$_6$F$_{13}$SO$_2$NCH$_2$CH$_2$CH$_2$NCH$_2$COONa:— (1)
　　　　　　　　　|　　　　　　　　|
　　　　　　　　　H　　　　　　　　H 15 g (0.033 mole) of N-(3-aminopropyl)perfluorohexyl sulfonamide and 100 g of isopropyl alcohol were weighed into a 500 ml four-necked round-bottomed flask equipped with a cooling condenser and stirrer, and heated to form a solution. With stirring at 80° C., 30 ml of an aqueous solution of 4.6 g (0.04 mole) of sodium monochloroacetate and 30 ml of an aqueous solution of 1.5 g (0.04 mole) of sodium hydroxide were simultaneously added dropwise to the solution. The mixture was reacted under reflux at 80° to 90° C. for 9 hours, and then the isopropyl alcohol and water were distilled off under reduced pressure. The yellow solid residue was dried at 60° C. under reduced pressure and recrystallized from ethanol to give 15.5 g of the captioned compound.

| | Elemental analysis | | |
|---|---|---|---|
| | C | H | N |
| Found (%) | 24.6 | 1.8 | 5.2 |
| Calculated (%) | 24.6 | 1.9 | 5.2 |

IR spectrum: 1590 cm$^{-1}$ (—COO$^\ominus$), 1370 cm$^{-1}$ (—SO$_2$N< νas).
NMR spectrum (D$_2$O solvent; DSS standard): 1.81 ppm (m, 2H), 3.00 ppm (t, 2H), 3.30 ppm (t, 2H), 4.18 ppm (s, 2H).

Synthesis of C$_6$F$_{13}$SO$_2$NCH$_2$CH$_2$CH$_2$NCH$_2$CH$_2$SO$_3$Na:— (2)
　　　　　　　　　|　　　　　　　　|
　　　　　　　　　H　　　　　　　　CH$_2$COONa In a 500 ml four-necked round-bottomed flask equipped with a cooling condenser and a stirrer, 15 g (0.028 mole) of sodium N-(N'-perfluorohexylsulfonyl-γ-aminopropyl)glycine was dissolved under heat in 100 g of isopropyl alcohol. With stirring at 80° C., 40 ml of an aqueous solution of 7.1 g (0.034 mole) of sodium 2-bromoethanesulfonate and 40 ml of an aqueous solution of 1.4 g (0.034 mole) of sodium hydroxide were simultaneously added dropwise to the solution. The mixture was reacted under reflux at 80° C. for 13 hours, and then the isopropyl alcohol and water were removed under reduced pressure. The yellow solid residue was dried at 60° C. under reduced pressure, and recrystallized from ethanol to give 9.7 g of the captioned compound.

| | Elemental analysis | | |
|---|---|---|---|
| | C | H | N |
| Found (%) | 26.3 | 2.3 | 4.9 |
| Calculated (%) | 26.6 | 2.2 | 4.8 |

IR spectrum: 1590 cm$^{-1}$ (—COO$^\ominus$), 1370 cm$^{-1}$ (—SO$_2$N< νas), 1070 cm$^{-1}$ (—SO$_3$Na νs).
NMR spectrum (D$_2$O solvent; DSS standard): 1.80 ppm (m, 2H), 3.06 ppm (m, 4H), 3.20 ppm (m, 4H), 4.10 ppm (s, 2H).

EXAMPLE 12

Synthesis of C$_6$F$_{13}$SO$_2$NCH$_2$CH$_2$CH$_2$N<$\substack{CH_2CH_2SO_3Na \\ CH_2CH_2SO_3Na}$
　　　　　　　　　|
　　　　　　　　　H 15 g (0.033 mole) of N-(3-aminopropyl)perfluorohexyl sulfonamide and 100 g of isopropyl alcohol were weighed into a 500 ml four-necked round-bottomed flask equipped with a cooling condenser and a stirrer, and heated to form a solution. At 80° C., 20 ml of an aqueous solution of 8.4 g (0.04 mole) of sodium 2-bromoethanesulfonate was added gradually to the solution, and the mixture was stirred for 15 minutes. Then, 20 ml of an aqueous solution of 1.5 g (0.04 mole) of sodium hydroxide was added, and the mixture was stirred for 30 minutes. The same operation as above was performed using the same amounts of the aqueous sodium 2-bromoethanesulfonate solution and the aqueous sodium hydroxide solution, and the mixture was reacted under reflux for 12 hours. The isopropyl alcohol and water were distilled off under reduced pressure. The yellow solid residue was dried at 60° C. under reduced pressure, and recrystallized three times from ethanol to give 8.3 g of the captioned compound.

| | Elemental analysis | | |
|---|---|---|---|
| | C | H | N |
| Found (%) | 22.1 | 2.0 | 3.7 |
| Calculated (%) | 21.8 | 2.1 | 3.9 |

IR spectrum: 1370 cm$^{-1}$ (—SO$_2$N< νas), 1070 cm$^{-1}$ (—SO$_3$Na νs).

NMR spectrum (D$_2$O solvent: DSS standard): 1.81 ppm (m, 2H), 3.08 ppm (m, 6H), 3.17 ppm (m, 6H).

What we claim is:

1. A fluorine-containing aminosulfonate selected from the group consisting of

C$_6$F$_{13}$SO$_2$NH(CH$_2$)$_3$N(CH$_3$)(CH$_2$)$_3$SO$_3$Na;

C$_6$F$_{13}$SO$_2$NH(CH$_2$)$_3$NH(CH$_2$)$_3$SO$_3$Na;

C$_6$F$_{13}$SO$_2$NH(CH$_2$)$_3$N(CH$_3$)(CH$_2$)$_2$SO$_3$Na;

C$_6$F$_{13}$SO$_2$NH(CH$_2$)$_3$NH(CH$_2$)$_2$SO$_3$Na;

C$_6$F$_{13}$SO$_2$NH(CH$_2$)$_3$N(CH$_3$)CH$_2$CH(OH)CH$_2$SO$_3$Na;

C$_6$F$_{13}$SO$_2$NH(CH$_2$)$_3$NHCH$_2$CH(OH)CH$_2$SO$_3$Na;

C$_6$F$_{13}$SO$_2$N(C$_3$H$_7$)(CH$_2$)$_3$N(CH$_3$)CH$_2$CH(OH)CH$_2$SO$_3$Na;

C$_6$F$_{13}$SO$_2$N(C$_3$H$_7$)(CH$_2$)$_3$NHCH$_2$CH(OH)CH$_2$SO$_3$Na; and

C$_6$F$_{13}$CONH(CH$_2$)$_3$N(CH$_3$)(CH$_2$)$_2$SO$_3$Na.

2. The fluorine-containing aminosulfonate of the formula

C$_6$F$_{13}$SO$_2$N(H)CH$_2$CH$_2$CH$_2$N(CH$_3$)CH$_2$CH$_2$CH$_2$SO$_3$Na.

3. The fluorine-containing aminosulfonate which has the formula

C$_7$F$_{15}$CON(H)CH$_2$CH$_2$CH$_2$N(CH$_3$)CH$_2$CH$_2$SO$_3$Na.

* * * * *